(No Model.) 2 Sheets—Sheet 1.

W. J. PERKINS.
REFUSE CONVEYER FOR SAW MILLS.

No. 294,073. Patented Feb. 26, 1884.

WITNESSES
George J. Downing
George Cook

INVENTOR
Willis J. Perkins,
By Suggett & Suggett.
Attorney (No Model.) 2 Sheets—Sheet 2.

W. J. PERKINS.
REFUSE CONVÉYER FOR SAW MILLS.

No. 294,073. Patented Feb. 26, 1884.

WITNESSES
George J. Downing
George Cook

INVENTOR
Willis J. Perkins.
By Leggett & Leggett
Attorney

UNITED STATES PATENT OFFICE.

WILLIS J. PERKINS, OF GRAND RAPIDS, MICHIGAN.

REFUSE-CONVEYER FOR SAW-MILLS.

SPECIFICATION forming part of Letters Patent No. 294,073, dated February 26, 1884.

Application filed December 21, 1883. (No model.)

*To all whom it may concern:*

Be it known that I, WILLIS J. PERKINS, of Grand Rapids, in the county of Kent and State of Michigan, have invented certain new and useful Improvements in Refuse-Conveyers for Saw-Mills; and I do hereby declare the following to be a full, clear, and exact description of the invention, such as will enable others skilled in the art to which it appertains to make and use the same.

My invention relates to an improvement in refuse-conveyers for saw and shingle mills, the object of the same being to provide a cheap device for carrying the spalt and refuse out of the mill a suitable distance to a fire-hole or refuse-burner; and it consists in certain details in construction and combinations of parts, as will be more fully described, and pointed out in the claims.

Figure 1:
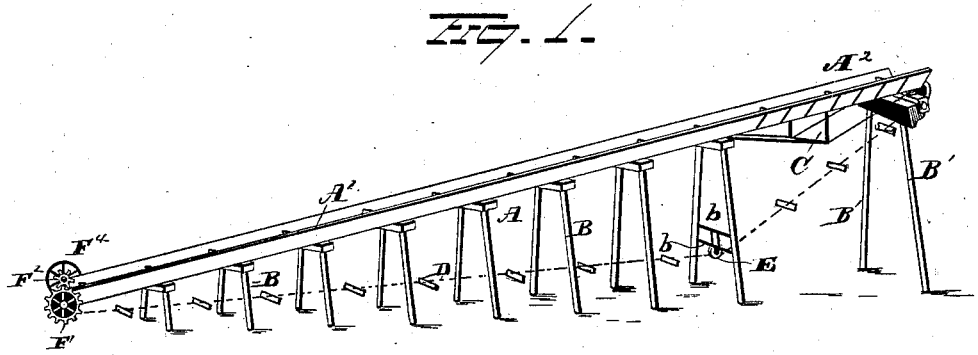
Figure 2:
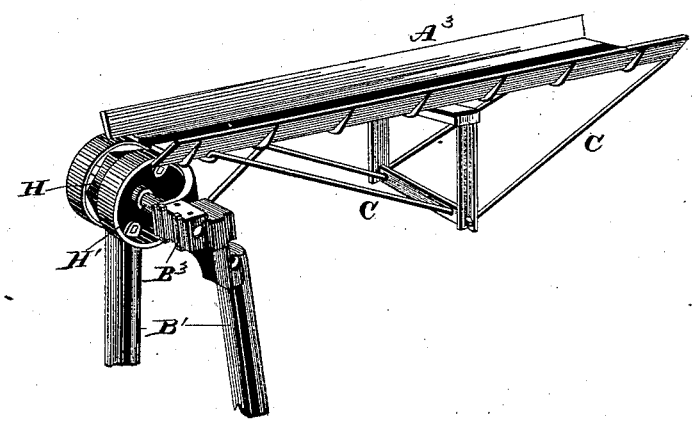
Figure 3:
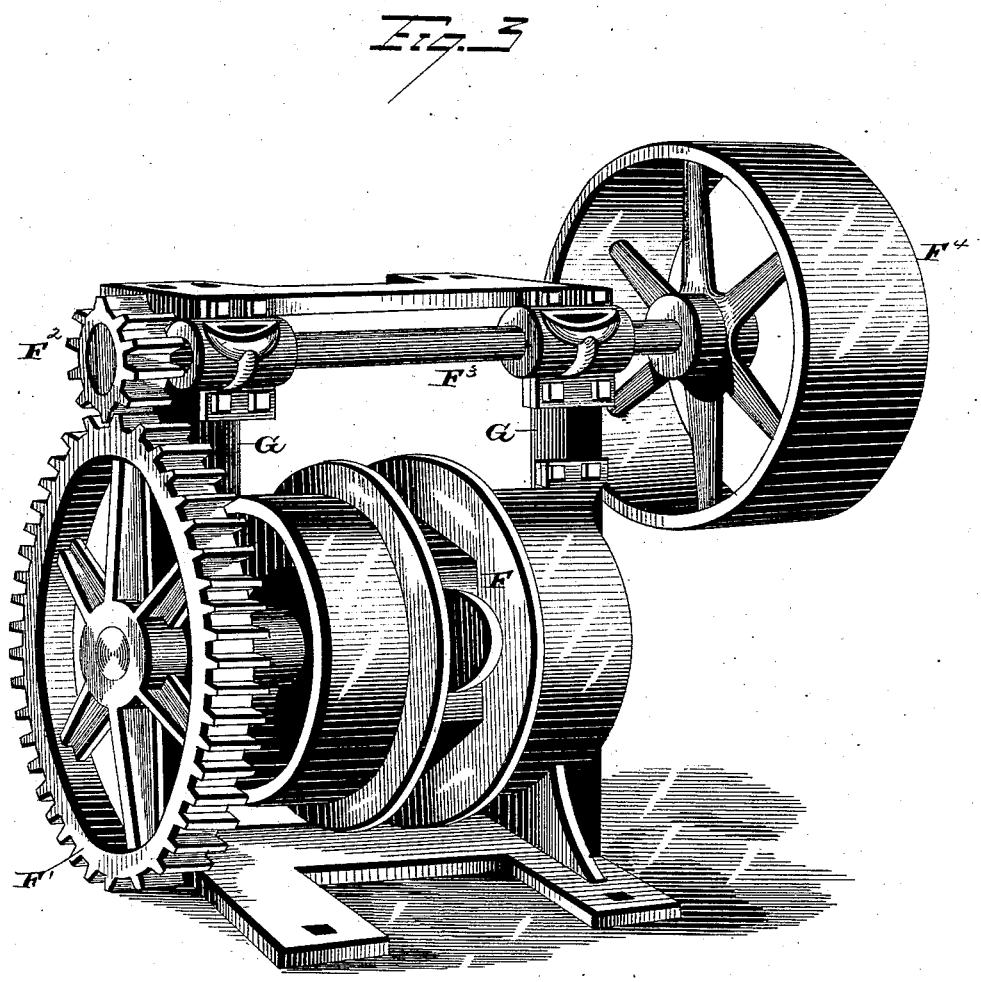

In the accompanying drawings, Figure 1 is a view in perspective of my improved conveyer. Fig. 2 is a similar view of the upper end of the conveyer, and Fig. 3 is a perspective view of the driving mechanism.

A represents the guideway, made in the form of a trough, and supported on the standards B B', which gradually increase in length from the inner to the outer end, so as to elevate the outer end thereof considerably above the inner end. The trough A is divided into two parts, A' and A², the part A' being made, preferably, of wood and the part A² of metal. The section A' is supported on wooden standards B, and the section A², which latter rests in close proximity to the fire-hole or refuse-burner, is supported at its outer end by the metallic standards B'. The adjacent ends of the two sections are secured together in any desired manner, and the section A², which is only provided with standards at its outer end, is strengthened by the trussed rods C, the opposite ends of which are secured to the section A' near the opposite ends thereof. This trough A can be of any desired length, and by constructing the outer portion thereof of metal the danger of ignition from the radiation of heat is prevented.

D is an endless chain, provided at suitable intervals apart with buckets or scrapers, which latter move within the trough, and carry the material deposited therein up the inclined way and discharge it into the fire-hole. This chain returns under the trough between the standards, and runs in contact with the tightener E, which latter consists of a roller journaled in a vertically-adjustable bearing on the bridge-trees $b$. By means of this tightener the tension of the chain can be regulated to suit circumstances. This chain is driven by the chain-wheel F, mounted in the metallic frame G, which latter is rigidly secured to the trough A or to a sill secured to the said trough. The outer end of the shaft of the chain-wheel F is provided with the large pinion F', which latter meshes with the smaller pinion F², rigidly secured to one end of the shaft F³. The opposite end of this shaft is provided with the driving-pulley F⁴, around which the drive-belt winds. The endless chain also passes around the chain-wheel H, which latter is rigidly secured to the shaft H', journaled to the upper ends of the metallic standards B' in the boxes B³. These boxes B³ are made of metal, and provided with wooden bearing-blocks, against which the shaft H' bears. In large mills the mass of refuse undergoing combustion at one time is of such dimensions as to evolve a large amount of heat, and as the bearings B³ are directly over the fire, it follows that a bearing of Babbitt metal would be useless. The wood bearings, which are confined in close-fitting iron shells, simply char, and can be replaced as often as necessary at an insignificant cost. The chain is passed around the wheels F and H, so that there will be no slack in the trough between them, all the slack being below the trough, where it is taken up by the tightener. By imparting motion to the band-wheel F⁴ the chain is caused to move up the inclined conveyer, and the buckets or sweeps secured thereto carry the refuse deposited in the trough up to the outer end thereof and discharge it directly into the fire-hole or furnace, where it is consumed.

A conveyer of this character is a necessity in a large mill, and, besides saving the wages of two or more men, reduces the insurance-premium considerably.

If desired, I can construct the entire trough out of metal and make it in detachable sections, so that its position can be readily changed when necessary; but a conveyer made up of two sections, one of wood and the other of metal, is cheaper than one made wholly of metal, and gives very satisfactory results.

It is evident that numerous slight changes in the details of construction can be resorted to without departing from the spirit of my invention, and hence I would have it understood that I do not confine myself to the exact construction of the parts shown and described, but consider myself at liberty to make such slight changes and alterations as fairly fall within the spirit and scope of my invention.

Having fully described my invention, what I claim as new, and desire to secure by Letters Patent, is—

1. A refuse-conveyer for saw-mills, consisting of a trough made up of two sections, the upper section being made of metal suitably trussed, and the lower of wood, and an endless chain provided with buckets or sweeps, which latter move in said trough, substantially as set forth.

2. A refuse-conveyer for saw-mills, consisting, essentially, of an inclined trough, an endless chain provided with buckets or sweeps, driving mechanism secured to the lower end of the trough, and a chain-wheel journaled to the upper end of a trussed metallic portion of the trough, substantially as set forth.

3. A refuse-conveyer for saw-mills, consisting of a trough made up of two sections, the lower section being made of wood and the upper section of metal, the outer end of the metallic portion of the trough being provided with metallic boxes and wooden bearing-blocks, and the lower end of the wooden trough being provided with the driving mechanism, and a suitable chain having buckets or sweeps secured thereto, substantially as set forth.

In testimony whereof I have signed this specification in the presence of two subscribing witnesses.

WILLIS J. PERKINS.

Witnesses:
ARTHUR C. DENISON,
ADOLPH B. MASON.